Oct. 22, 1935.  E. W. FERRY  2,018,301

CAP NUT

Filed June 10, 1935

INVENTOR
Edward W. Ferry
BY Evans & McCoy
ATTORNEY

Patented Oct. 22, 1935

2,018,301

UNITED STATES PATENT OFFICE 2,018,301

CAP NUT

Edward W. Ferry, Lakewood, Ohio

Application June 10, 1935, Serial No. 25,769

2 Claims. (Cl. 85—35)

This invention relates to improvements in fastening devices, and more particularly to bolt terminal members such as heads or nuts which are provided with non-corrosive, ornamental caps or sheaths composed of rust-proof metal and which can be burnished or polished for ornamental effect.

Caps for nuts and bolt heads are usually provided with a dome-shaped portion projecting from the outer side of the head or nut. The caps in some instances have been round, dome-shaped members the rims of which were secured to the head or nut outwardly of the polygonal wrench receiving portion thereof. In other instances caps have been used which extend over and cover the polygonal portion of the nut or head. The relatively thin metal domes of such caps are easily dented or distorted by impact, the distortion often being sufficient to loosen the attachment between the cap and the nut or bolt head. In the case of caps extended over the polygonal portion of bolt terminal members, the caps have been subject to distortion and loosening by frictional engagement of their marginal edges with the surface against which the terminal member bears when the bolt or nut is screwed tight.

Difficulty has heretofore been experienced in the manufacture of cap nuts of the type in which the cap covers the polygonal faces of the nut, due to the fact that pressure applied to the nut and cap to force the rim of the cap into locking engagement with the nut, or to force the cap into close frictional engagement with the polygonal portion of the nut, has caused the metal of the nut to flow, with the result that the thread has been distorted, making it difficult to screw the nut onto its bolt and often necessitating a second tapping operation after the cap is applied to the nut.

The principal objects of the present invention are to provide a terminal member with a dome-shaped cap which is reinforced and strengthened by providing a tapering projection on the head of the nut which fits within the dome portion of the cap so that the dome portion of the cap is strongly reinforced and is less subject to distortion by impact, and to provide a cap which covers the polygonal portion of the terminal member and which is retained in place by a marginal flange seated in a marginal rabbet at the periphery of the inner face of the member, the rabbet being of a depth such that the exterior face of the flange is offset from the plane of the inner thrust receiving base of the member, so that no part of the cap has frictional engagement with the surface against which the inner face bears.

A further object is to provide a cap nut having a threaded bore of a length corresponding to that provided in a castellated nut of the same size.

A further object is to provide a cap nut so designed that the cap may be attached to the nut without subjecting the body of the nut to pressure, tending to distort the threaded bore thereof.

With the above and other objects in view, the invention may be said to comprise the device as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification, in which.

Figure 1:
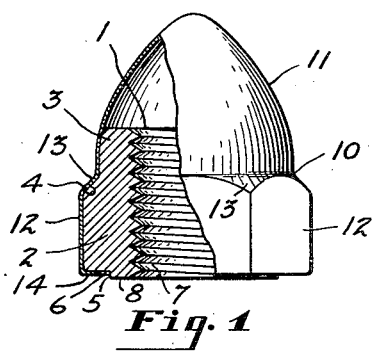
Figure 1 is a side elevation of a cap nut embodying the invention, a portion of the cap and nut being broken away and shown in axial section.
Figure 2:
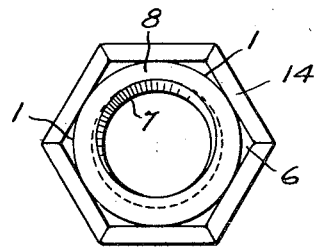
Fig. 2 is a bottom plan view of the cap nut shown in Fig. 1.

In the embodiment of the invention shown in the drawing, the terminal member to which the cap is applied is in the form of a nut 1, which has a body portion 2 polygonal in form provided with flat faces and adapted to receive a wrench. The nut has a tapering projection 3 on its outer side which is round in cross section and which is of a size such that its base is substantially tangent to the flat faces of the polygonal portion. The corners or apices of the polygonal portion of the nut project outwardly from the round tapered portion 3 providing ledges 4. The inner face of the nut is provided with a peripheral rabbet 5 providing a circumferential ledge 6 spaced inwardly from the inner portion of the inner face of the nut. The nut has a threaded bore 7 extending through the polygonal and tapered portions thereof, and between the rabbet 5 and the threaded bore 7 there is provided a flat annular thrust face 8.

A cap 10 is provided which has a dome 11 which is round in cross-section, the base portion of the dome 11 being formed to fit upon the tapering projection 3. The cap has a polygonal portion 12 which fits upon the polygonal body portion 2 of the nut. The cap is in the form of a one-piece stamping formed in a die, shaped to conform to the peripheral surfaces of the polygonal portion 2 and tapering projection 3 of the nut.

The cap, therefore, has shoulders 13 which seat upon the ledges 4 of the nut. At its margin, the cap has an inturned flange 14 which bears against the ledge 6 of the rabbet 5, the depth of which is greater than the thickness of the flange 14. The cap is securely held in place by the flange 14, the exterior face of which is spaced inwardly from the plane of the bearing face 8 of the nut.

It is not necessary that the cap have a tight gripping engagement with the peripheral faces of the body portion 2 and tapered projections 3 of the nut. A reasonable tolerance may be permitted in the dimensions of the bar stock from which the nuts are formed, commercial tolerances allowed for such bar stock, providing a sufficiently accurate fit between the nut and cap. The nut may be placed within the cap in the final forming die and the flanges 14 may then be formed by a ring die which engages the peripheral edge of the cap and forces it inwardly against the ledge 6. The body of the nut is not subjected to pressure sufficient to cause any distortion thereof.

It will be apparent that the present invention provides a capped terminal member which can be manufactured economically, which possesses great strength and in which the cap is so secured to the terminal member that it may be subjected to considerable rough usage without serious distortion and without becoming loosened from the nut or the terminal member.

Although a single embodiment of the invention has been herein shown and described it will be understood that numerous details of the construction shown may be altered or omitted without departing from the spirit of this invention as defined in the following claims.

What I claim is:

1. A fastening device comprising a bolt terminal member having a polygonal body portion with flat peripheral faces, a champfered portion at its outer end and a round tapering projection extending axially outwardly from said champfered portion concentric with the polygonal portion whereby ledges are provided at the apices of said polygonal body portion, said member having a marginal rabbet forming a circumferential ledge at its inner end and a flat thrust receiving bearing face radially inwardly of the rabbet, and a cap in the form of a cup-shaped stamping having a polygonal portion which fits over the polygonal body portion of said member, a dome portion which fits upon said tapering projection and shoulder portions which seat upon the ledges at the base of said projection, said cap having a marginal inturned flange seated upon the ledge formed by the rabbet to retain the cap on said member, the thickness of said flange being less than the depth of the rabbet whereby the rim of the cap is offset outwardly from the plane of said thrust receiving bearing face.

2. A fastening device comprising a bolt terminal member having a polygonal body portion with flat peripheral faces, a champfered portion at its outer end and a round tapering projection extending axially outwardly from said champfered portion concentric with the polygonal portion, whereby ledges are provided at the apices of said polygonal body portion, said member having a marginal rabbet forming a circumferential ledge at its inner end and a flat thrust receiving bearing face radially inwardly of the rabbet, said member having a threaded bore extending axially through the body portion and tapering projection, and a cap in the form of a cup-shaped stamping having a polygonal portion which fits over the polygonal body portion of said member, a dome portion which fits upon said tapering projection and shoulder portions which seat upon the ledges at the base of said projection, said cap having a marginal inturned flange seated upon the ledge formed by the rabbet to retain the cap on said member, the thickness of said flange being less than the depth of the rabbet whereby the rim of the cap is offset outwardly from the plane of said thrust receiving bearing face.

EDWARD W. FERRY.